United States Patent [19]

Senehi

[11] Patent Number: 5,134,305
[45] Date of Patent: Jul. 28, 1992

[54] WIND POWER MACHINE

[76] Inventor: David Senehi, 301 Galster St., Syracuse, N.Y. 13206

[21] Appl. No.: 407,851

[22] Filed: Sep. 14, 1989

[51] Int. Cl.$^5$ ............................................. F03D 5/02
[52] U.S. Cl. ............................................. 290/55; 416/8
[58] Field of Search .................... 290/44, 55; 415/5; 416/7, 8, 9, 17

[56] References Cited

U.S. PATENT DOCUMENTS

| 1,526,631 | 2/1925 | Fagan | 416/9 |
| 2,346,595 | 4/1944 | Manning | 416/8 |
| 4,494,008 | 1/1985 | Patton | 290/44 |

FOREIGN PATENT DOCUMENTS 1423777  9/1988  U.S.S.R. ................ 290/55

Primary Examiner—J. R. Scott
Assistant Examiner—W. E. Duncanson, Jr.
Attorney, Agent, or Firm—Katherine McGuire

[57] ABSTRACT

Wind powered apparatus for attachment to a generator is provided to produce electricity. A series of foldable sails are attached to an endless chain having upper and lower reaches. Guide means control the folding and unfolding of the sails as they travel along the chain. The surface of the unfolded sails always face the wind to obtain maximum benefit therefrom while the folded sails, which travel against the wind to return to an unfolded position, act as wind vanes to keep the sails in proper position with respect to wind direction. As one sail drops to the lower chain reach, another sail rises to the upper chain reach for maximum efficiency. A plurality of such chain assemblies are placed laterally adjacent one another to create a "wind platform". Sprockets attached to the chain turn a shaft which powers a generator.

11 Claims, 5 Drawing Sheets

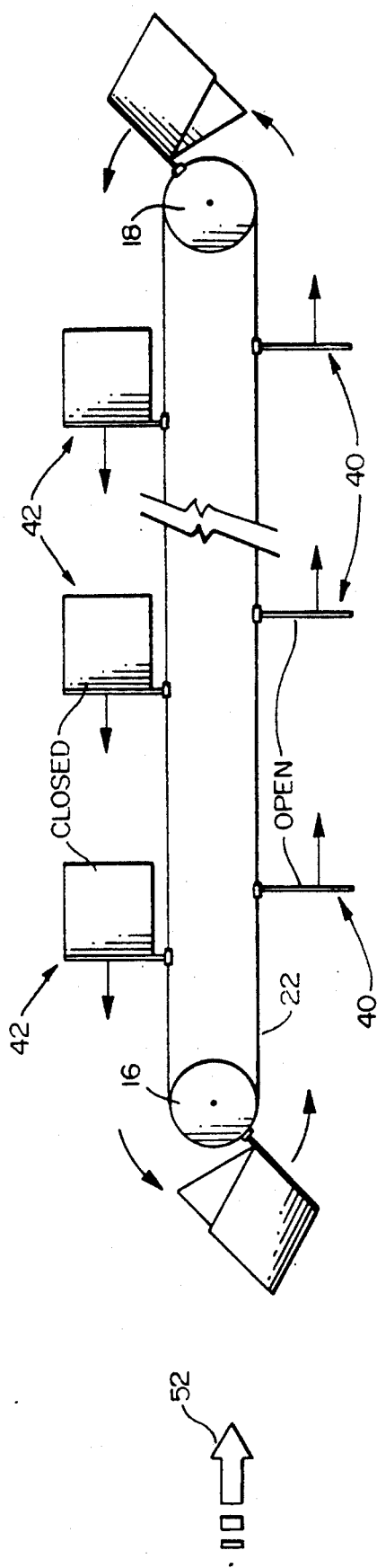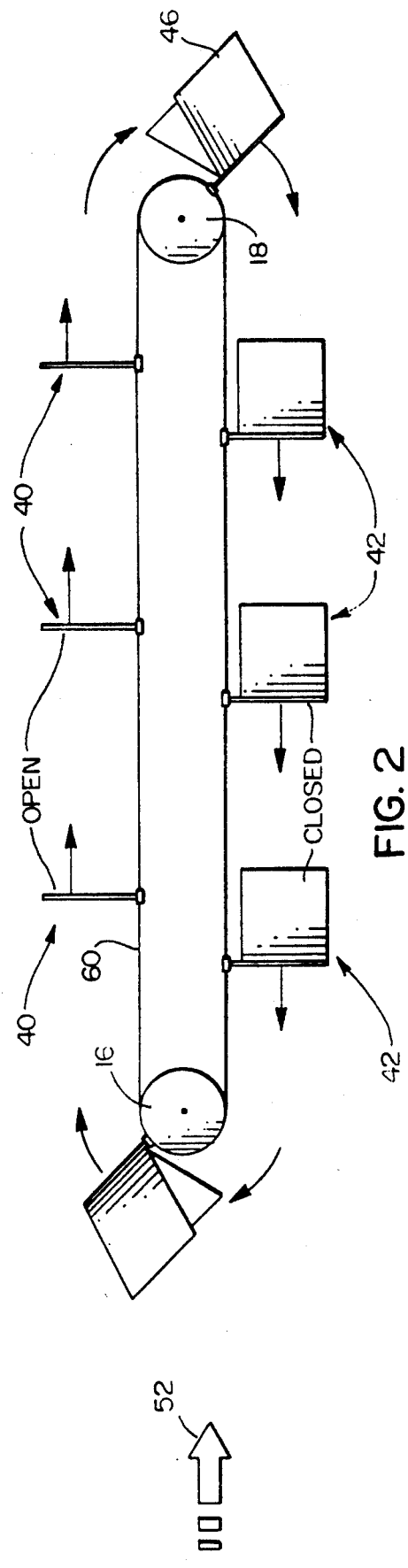

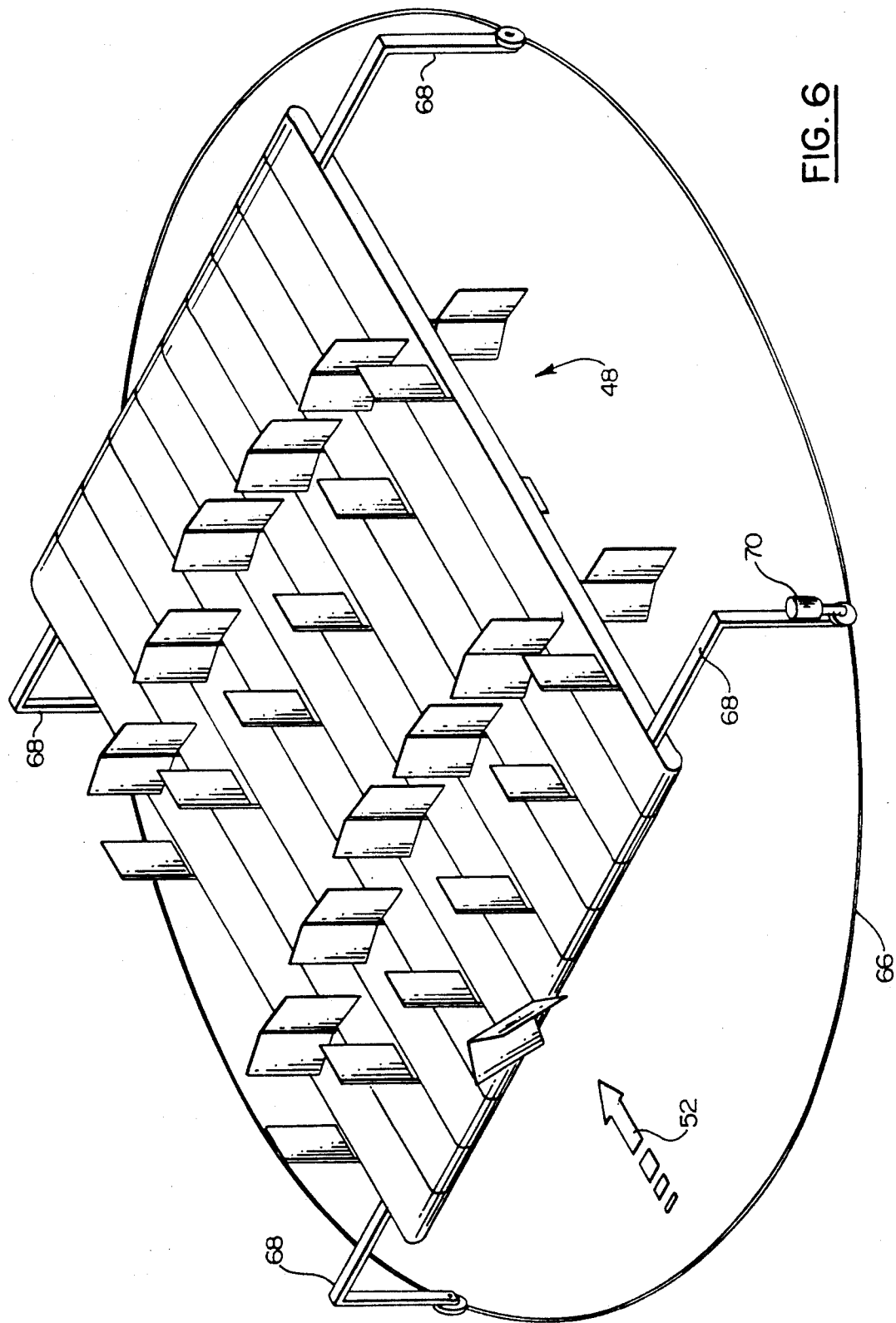

WIND POWER MACHINE

BACKGROUND OF THE INVENTION

This invention relates to apparatus for creating electric power by harnessing the wind's energy and, more particularly, to a novel and unique apparatus which employs wind driven sails mounted upon a plurality of adjacent, endless tracks to power a generator.

With the advent of the widespread use of electricity, man has continued in his pursuit of finding new and inexpensive sources of producing electricity. Wind power has long been used as one such source. It was found not only to be a significantly inexpensive source of power, but it also had the advantage of not having any adverse affect on our environment, as do many other of man's sources of electricity.

Such wind power apparatus typically include an arrangement of vanes, propellers or sails to capture the force of the wind, as seen in the earliest forms of wind mills. A more recent wind power machine employing wind driven sails can be seen in U.S. Pat. No. 3,730,643, issued to Davison in May of 1973.

The Davison patent provides truck mounted sails which are adjustable about a vertical pivot. The trucks travel along an endless, horizontal track which allows driving of an electric generator when it is moved by the sails catching the wind. The sails must be adjusted by an electric motor drive controlled by a wind vane such that they offer the greatest wind resistance along one run of the track and the least resistance while moving in the reverse direction along the other run of the track. Furthermore, the Davison sails do not always have their surfaces facing into the wind such that the direction of the wind is normal to the surface of the sail, as do the present invention's sails. Other differences will become obvious in the ensuing description of applicant's invention.

The main object of the present invention is to provide very efficient apparatus for harnessing wind power.

Another object is to provide simple and economical means for producing significant amounts of electricity.

Other objects will in part be obvious and will in part appear hereinafter.

SUMMARY OF THE INVENTION

Applicant's invention utilizes the power of the wind by providing a plurality sails mounted in series upon a plurality of adjacent, endless chains. When actuated by a wind, the sails move the chains which move sprockets to rotate a shaft which powers a generator.

The sails include two flaps which are attached laterally adjacent one another to a hinged post. Fixedly attached to the post are a pair of laterally extending arms with guide means such as pins or rollers, which travel along a pair of spaced guide rails.

The post is fixedly attached at one end to the endless chain, the chain being trained over a pair of substantially spaced toothed sprockets, to define upper and lower reaches of the chain. A series of such chain assemblies are positioned adjacent one another, their respective sprockets aligned by a pair of elongated shafts extending through the respective centers thereof.

The direction of chain movement alternates with each laterally successive chain assembly due to the aforementioned spacing of the guide rails. In particular, in a single chain assembly, a pair of elongated guide rails are spaced apart a predetermined equidistance along the aforementioned upper reach of the chain, the chain extending linearly between and along the guide rails. When a sail travels along this upper reach, it is in a first, open position, thereby attaining maximum resistance from a wind blowing normal to the sail's exposed surface. When the sail approaches a sprocket, the guide rails it travels along begin to bend closer together. Finally, along the lower chain reach, the paired guide rails are substantially a closer equidistance apart than they are along the upper chain reach.

In this way, when the pins or guide rollers travel along the guide rails, they keep the sails in the open position when they travel along the guide rails which are spaced furthest apart, and they close the flaps upon themselves, due to the folding of the hinged post, when the sails travel along the guide rails which are closest together. This spacing of the guide rails reverses with each laterally successive chain assembly, that is, when there is maximum spacing of a pair of guide rails along the upper reach, as just described, there is minimum spacing of the guide rails along the upper reach for the chain assembly which lies immediately adjacent to this chain assembly, and vice versa along the lower reach. This alternating relationship continues for as many chain assemblies as are desired to lay adjacent one another.

The alternating spacing of the guide rails provides that while the sails are in their open position along the upper reach of one chain assembly, the sails are in their closed position for the chain assembly along the upper reach immediately adjacent. The reverse is true along the lower reach, that is, when the sails move into their closed position along the lower reach from an open position along the upper reach, the chain assembly immediately adjacent moves into an open sail position along the lower reach from a closed sail position along the upper reach.

This arrangement provides for maximum benefit from the wind, receiving wind resistance along both the upper and lower reaches of the chain assemblies arranged in this manner. When the sails are in their closed position, they offer virtually no resistance to the wind. This arrangement is very efficient since open sails offer great resistance and travel in the direction of the wind while respective closed sails offer no resistance when they must travel against the wind, in returning along one reach of the chain to begin an open sail position again along an opposite reach of chain.

The sprockets driven by the moving chain assemblies in turn rotate a shaft which may drive electric generators, which may be placed at any or all sprocket positions, depending on the number of chain assemblies desired.

When a plurality of such chain assemblies are laid adjacent one another, a "wind platform" is created. This platform may then be mounted upon a circular track such that it may rotate in response to electrical signals from a wind vane positioned some distance away. In response to the signals from the wind vane, the platform may rotate about the track such that open sail surfaces are directed to face the blowing wind, thereby receiving the maximum effect therefrom.

In an alternate embodiment, wind vanes extend from the sides of the wind platform to keep the surfaces of the open sails facing the wind, creating maximum wind resistance to move the chain assemblies at top speed.

BRIEF DESCRIPTION OF THE DRAWINGS

FIG. 2 is an elevated, diagrammatic, side view of one chain assembly showing both open and closed positions of the sails, wherein the guide rails are spaced as shown in FIG. 1.

FIG. 3 is an elevated, diagrammatic, side view of another chain assembly with the opposite spacing of the guide rails shown in FIGS. 1 and 2, and intended to lie adjacent to the chain assembly of FIG. 2.

FIG. 6 is a perspective view, showing the wind platform mounted upon a circular track.

DETAILED DESCRIPTION

Figure 1:
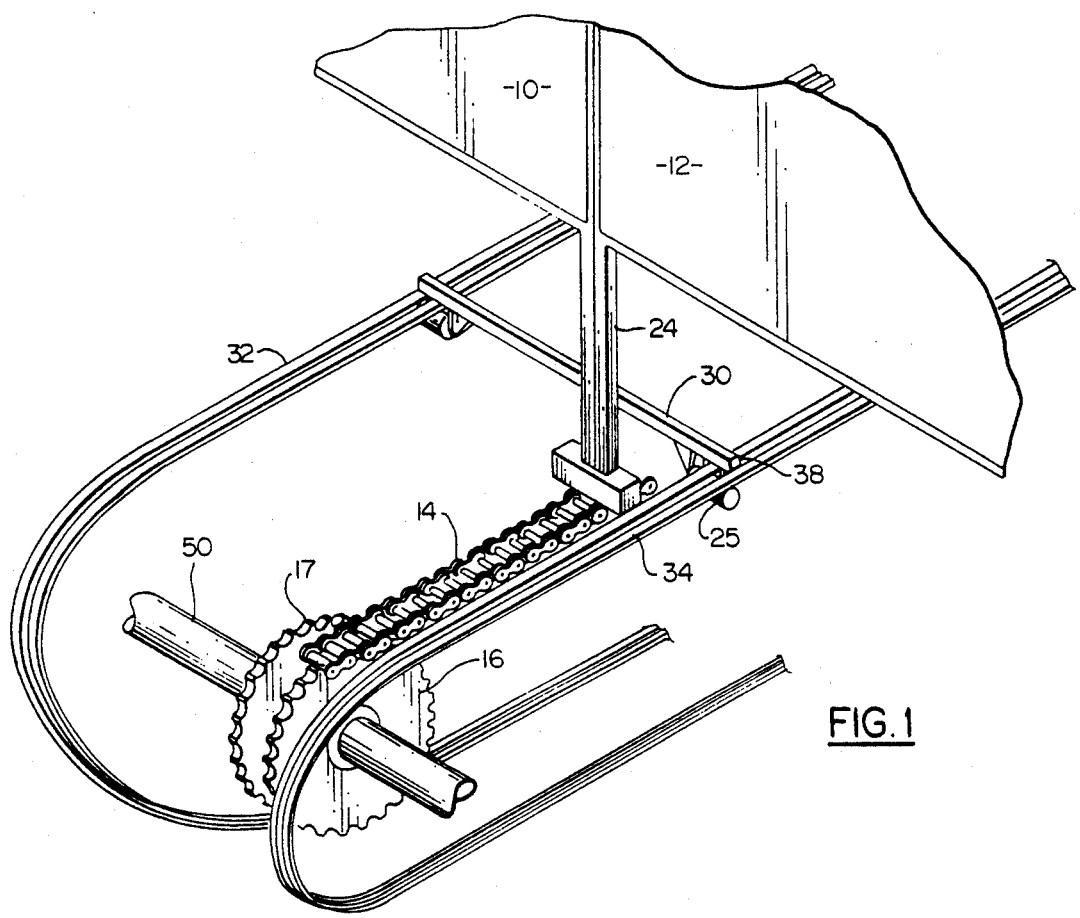
FIG. 1 is a fragmentary, perspective view of a sprocket and chain assembly, a sail mounted thereto, also shown in fragment.

Referring now to the drawings, there is seen in FIG. 1 a fragmentary view of a pair of symmetrical flaps, 10 and 12 of a sail 8, mounted upon an endless chain 14. Chain 14 is trained over a pair of substantially spaced sprockets 16 and 18, as best seen in FIGS. 2 and 3, to define upper and lower chain reaches 20 and 22, respectively.

Flaps 10 and 12 are attached laterally adjacent each other to hinged post 24 which may fold upon itself along an axis perpendicular to the chain. A free end of post 24 is fixedly attached to chain 14 by securing block 26. Post 24 includes a pair of laterally extending arms 28 and 30, which are directed along elongated, grooved, guide rails 32 and 34 by guide pins 36 and 38 engaged therewith, when flaps 10 and 12 move chain 14 by a wind blowing normal to the sails' surface. Equivalent means of guiding sails 10 and 12 along rails 32 and 34 are contemplated; for instance, guide rollers instead of guide pins 36 and 38 could be provided to run along rails 32 and 34, including means to bring the rollers closer together along the opposite reach of chain, such as a pair of rails which are closer together and offset from the further spaced rails which the rollers may transfer over to when traveling along that reach of chain.

The spacing of guide rails 32 and 34 control the folding and unfolding of hinged post 24, and thereby the opening and closing of flaps 10 and 12. As can be seen in the diagrammatic view of FIG. 2, flaps 10 and 12 are in an open position along upper reach 20, referenced by numeral 40, and are in a closed, folded position along lower reach 22, referenced by numeral 42. This is possible due to the spacing of guide rails 32 and 34, as seen in FIG. 1. In particular, guide rails 32 and 34 are spaced about upper reach 20 such that flaps 10 and 12 assume a first, open position, as seen in FIG. 1 and referenced by numeral 40 in FIG. 2. Here, guide rails 32 and 34 bend substantially together about sprockets 16 and 18, thereby forcing guide pins 36 and 38 closer together. Hinged post 24 begins to fold about an axis perpendicular to the chain and eventually brings flaps 10 and 12 to a second, closed position 42. When traveling around sprockets 16 and 18, flaps 10 and 12 will be partially open, as seen in FIG. 2 and referenced by numerals 44 and 46. It should be apparent that flaps 10 and 12 could be formed as a single flap (i.e., sail) that is foldable along its center line about post 24, instead of two separate smaller flaps, as shown. Rollers 23 and 25 are attached to arms 28 and 30 and bear upon the underside of rails 32 and 34, and are provided to prevent strong winds from tipping over flaps 10 and 12.

Figure 7:
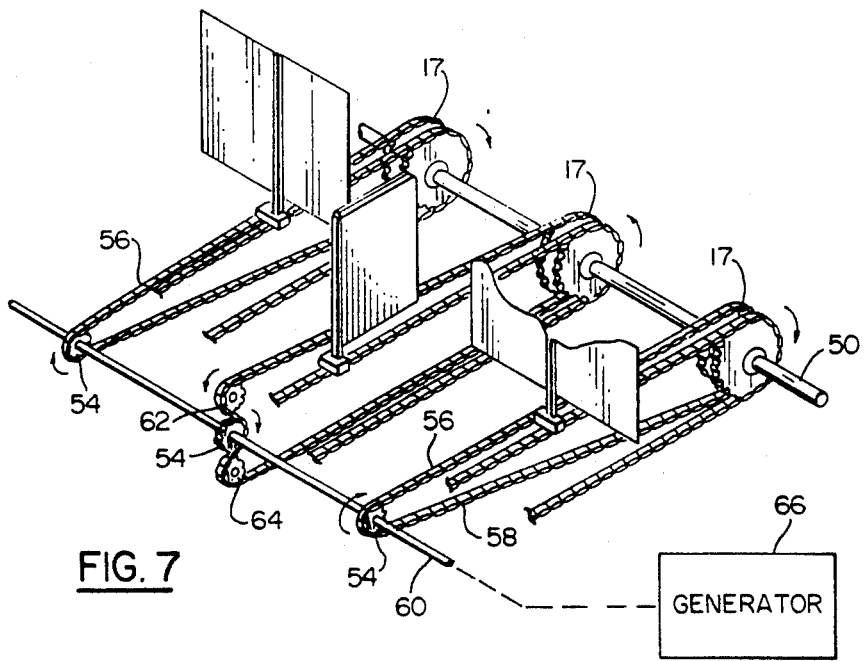
FIG. 7 is a perspective, diagrammatic view of the chain assembly of the invention powering a generator.
Figure 4:
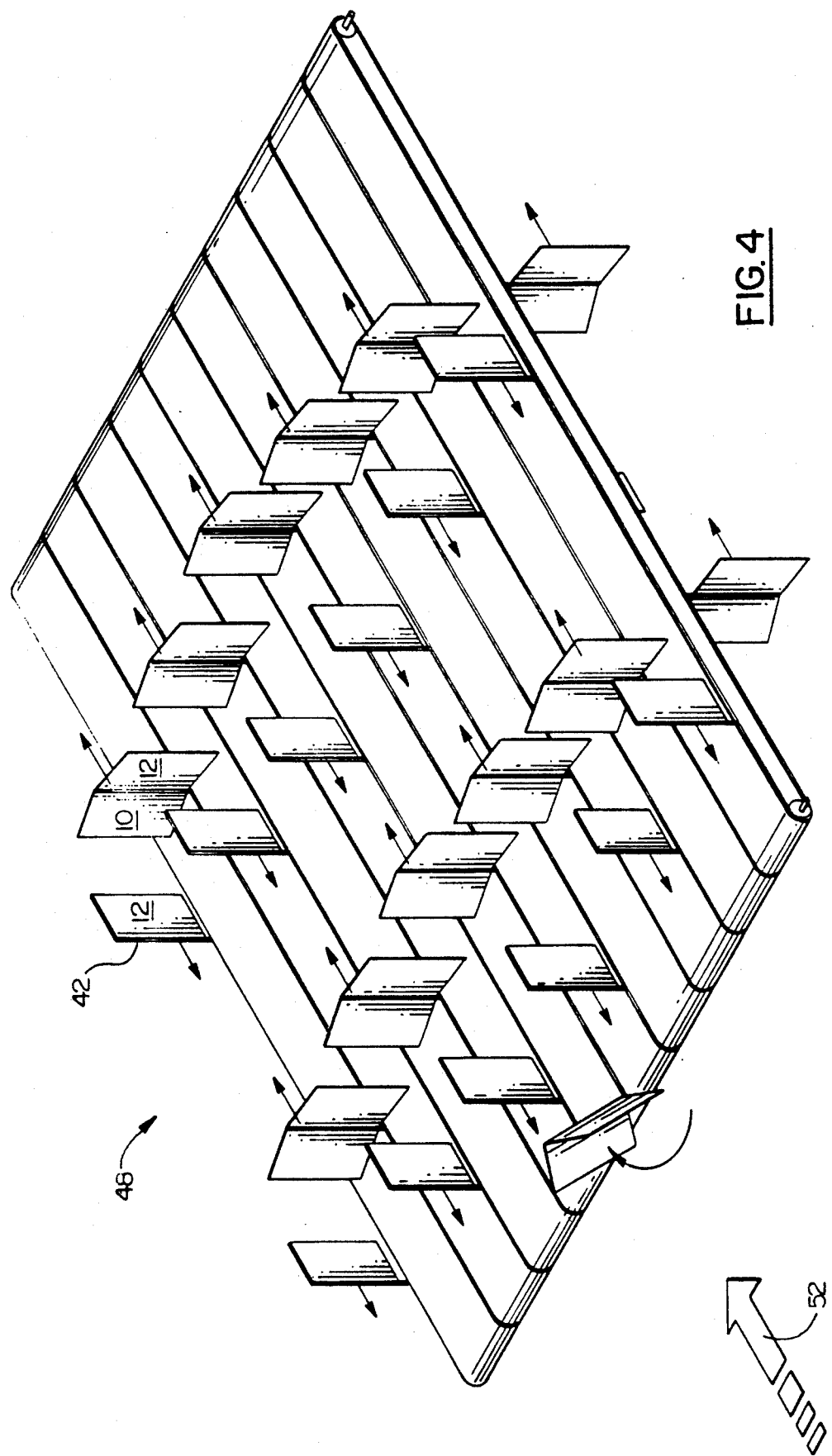
FIG. 4 is a perspective, top view of a wind platform wherein a plurality of the chain assemblies of FIGS. 2 and 3 are placed alternately adjacent one another.
Figure 5:
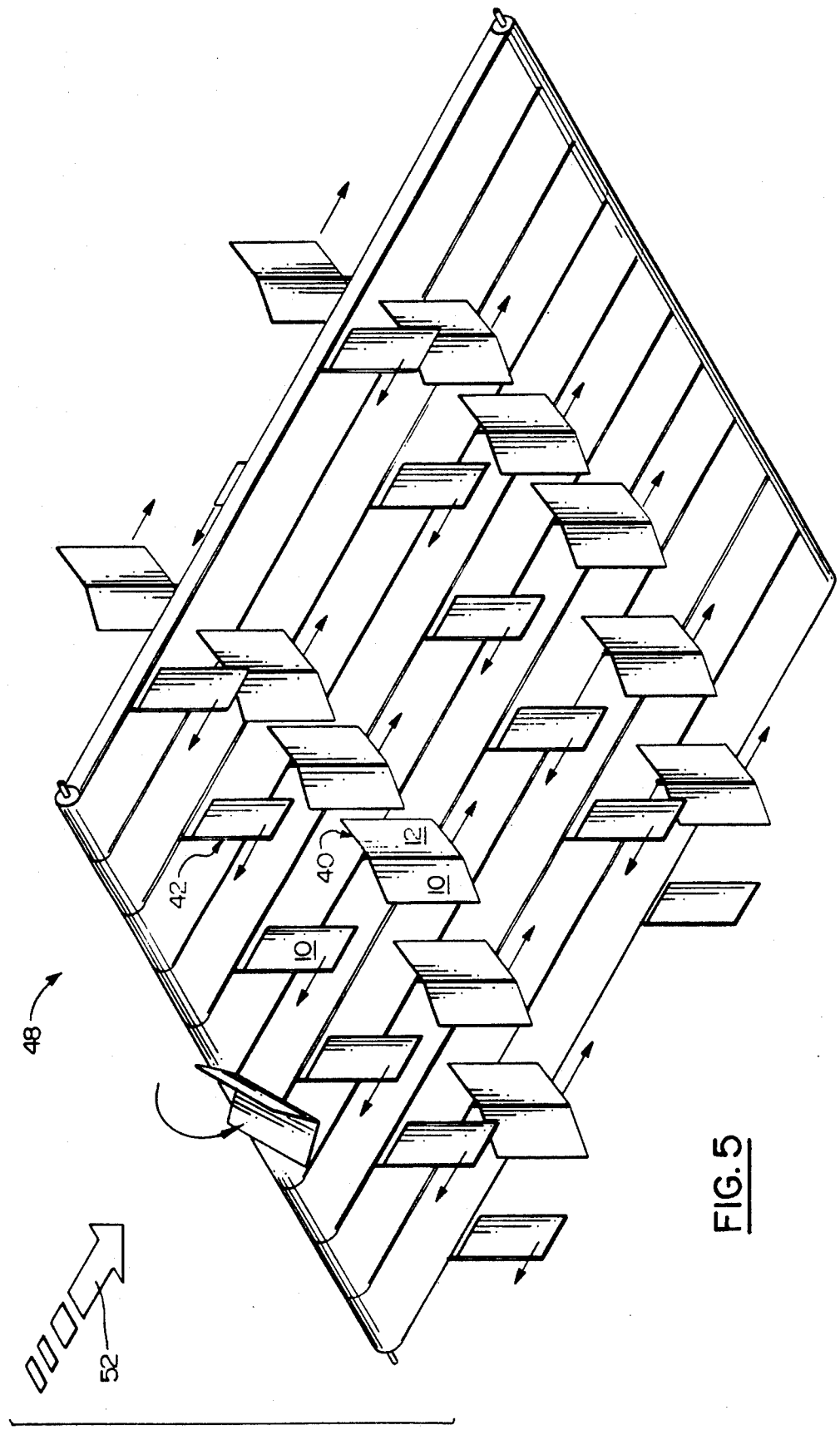
FIG. 5 is a perspective, bottom view of the wind platform of FIG. 4.

To construct a "wind platform", as generally referenced by numeral 48 in FIGS. 4 and 5, a plurality of the chain assemblies of FIGS. 2 and 3 are placed in alternate lateral succession. Sprockets 16 and 18 are axially aligned with respective sprockets of each such chain assembly through their centers with shafts 50, seen in FIG. 1, and shaft 60, as seen in FIG. 7, respectively.

As discussed, the chain assembly of FIG. 2 represents the open and closed positions 40 and 42, respectively, of flaps 10 and 12 when guide rails 32 and 34 are spaced as in FIG. 1. FIG. 3 represents the open and closed positions 40 and 42, respectively, of flaps 10 and 12 when guide rails 32 and 34 are spaced in opposite configuration to that as in FIG. 1. That is, for the chain assembly of FIG. 3, guide rails 32 and 34 are closer together along upper reach 20 than they are along lower reach 22. This is the reverse of FIGS. 1 and 2, wherein guide rails 32 and 34 are closer together along lower reach 22 and further apart along upper reach 20.

In this way, when a plurality of the chain assemblies of FIGS. 2 and 3 are placed in alternate later succession, as seen in FIGS. 4 and 5, flaps 10 and 12 are in open position 40 along upper reach 20 for one chain assembly and flaps 10 and 12 along upper reach 20 of the chain assembly immediately adjacent will be in closed position 42. Concurrently, as seen in the bottom plan view of FIG. 5, the chain assembly with flaps 10 and 12 in open position 40 along upper reach 20 will be in closed position 42 along lower reach 22. Also, the chain assembly immediately adjacent, with flaps 10 and 12 in closed position 42 along upper reach 20, will be in open position 40 along lower reach 22.

This particular arrangement provides, and the force of the wind dictates, that while chain assemblies with flaps 10 and 12 in open position 40 along upper reach 20 are traveling in the direction of the wind, chain assemblies with flaps 10 and 12 in closed position 42 along upper reach 20 are traveling in the reverse direction, against the wind. It may, then, be readily surmised that while flaps 10 and 12 are in closed position 42, they offer the least resistance to the wind and that while in open position 40, flaps 10 and 12 offer the greatest resistance to a wind blowing normal to its surface. There is then virtually no drag imposed upon a chain assembly when flaps 10 and 12 return along one reach of chain in closed position 42 to open into position 40 along the opposite reach of chain.

When the wind blows in the direction indicated by reference numeral 52 in the various Figures, flaps 10 and 12, when in open position 40, will move in the direction of the wind and concurrently those in closed position 42 will move against the wind. Also, as can be seen in the various Figures, posts 24 are arranged on each chain assembly such that while one sail comes into open position 40 on one chain assembly, another sail is, at the same time, going into closed position 42. This is true along all laterally placed chain assemblies due to their common attachment of sprocket 18 to shaft 60. More specifically, FIG. 3 shows sail 42' traveling downwardly around sprocket 16 to assume open position 40 along lower chain reach 22 while, at the same time, sail 40' is traveling upwardly around sprocket 18 to assume closed position 42 along upper chain reach 20. This arrangement provides that the energy required to pull sail 40' upward and around sprocket 18 is cancelled out by the energy provided by sail 42' traveling downwardly around sprocket 16, due in part to gravity and in part to the wind's effect.

When chain 14 is actuated by a wind, sprocket 16 will turn about shaft 50. The turning of sprocket 16 forces the turning of adjacent, co-axial sprocket 17 in the same rotational direction as sprocket 16. As can be seen in FIG. 7, which is a diagrammatic view of three adjacent chain assemblies showing the additional chain assembly of the invention which directly powers a generator, sprockets 17 are substantially spaced from smaller sprockets 54. Endless chains 56 are trained over sprockets 17 and 54, to define upper and lower chain reaches 56 and 58, respectively. When sprockets 16 actuate sprockets 17, sprockets 17 actuate moving of sprockets 54, which are co-axially aligned and fixedly attached to shaft 60. Turning of shaft 60 requires that sprockets 54 all rotate in the same direction. Since sprockets 17 do not all rotate in the same direction, due to the previously discussed alternate spacing of guide rails 32 and 34 in lateral successions of chain assemblies, idler wheels 62 and 64 have been provided on every other chain assembly such that sprockets 54 all turn in the same rotational direction. The turning of shaft 60 powers attached generator 66.

Wind platform 48 may be mounted upon circular track 66 with engageable wheeled legs 68. Servo motor 70 is provided upon a leg 68 such that it may receive electric signals from a wind vane positioned some distance away to rotate platform 48 about track 66, depending on the direction of the wind. In this way, the surfaces of open flaps 10 and 12 of a sail are always facing normal to the direction of the wind to receive maximum benefit therefrom. In an alternate embodiment, large wind vanes are fixedly attached to platform 48 to keep the surfaces of flaps 10 and 12 facing the wind.

What is claimed is:

1. Wind powered apparatus for producing electricity comprising:
    a) an endless chain trained over and movable in a continuous path about two substantially spaced-apart sprockets, to define upper and lower, substantially horizontal chain reaches;
    b) a plurality of sails fixedly attached to said chain, said sails each including adjacent, first and second, superposable flaps having surfaces of substantially equal areas, said flaps being moveable between a first, open position wherein said surfaces are in laterally adjacent, subststantially co-planar relation and a second, closed position wherein said first and second flaps are folded about an axis perpendicular to said chain with said surfaces in facing, substantially superposed relation in a plane perpendicular to the plane of said sail when in said first, open position;
    c) guide means positioned adjacent said chain and operable to effect movement of said flaps into said first, open position when said sail travels with said chain along one of said reaches, and into said second, closed position when said sail travels with said chain along the other of said reaches;
    d) a rotary electrical generator;
    e) means connecting at least one of said sprockets to said generator to rotate the latter in response to movement of said chain by wind acting upon said sail flaps when in said first, open position thereof.

2. The invention according to claim 1 wherein said guide means comprises a pair of elongated rails respectively positioned adjacent opposite sides of said chain.

3. The invention according to claim 2 wherein said rails are spaced a predetermined equidistance apart along one of said reaches of said chain such that said flaps assume said first, open position when operationally engaged therewith, said rails bending smoothly and substantially closer together in the area where said rails extend around said sprockets, said rails being spaced substantially close together along the other of said reaches of chain such that said flaps assume said second, closed position when operationally engaged therewith, said sail flaps each including means for slidable engagement with said rails.

4. The invention according to claim 3 wherein said rails are each endless and grooved, said flap engagement means comprising guide pins for receival therein by said rail grooves.

5. The invention according to claim 1 and further including a plurality of hinged posts, each fixedly attached to said chain for movement about an axis perpendicular to said chain, and means fixedly attaching each of said sails to a respective one of said posts.

6. The invention according to claim 5 and further including a pair of arms attached at a first end to said post and laterally extending therefrom and wherein said engagement means are fixedly attached to the second, free ends thereof for slideable engagement with said rails.

7. The invention according to claim 1 and further including means to effect the rotational movement of said apparatus about a vertical axis such that said flaps in said first, open position are continuously facing a wind such that said wind blows normal to said open flap surface.

8. The invention according to claim 7 wherein said rotating means comprises a circular track, said apparatus including wheels attached thereto for slideable engagement with said track, said apparatus including a motor to effect rotation about said track upon receival of an electric signal from a wind vane positioned some distance away.

9. Wind powered apparatus for producing electricity comprising:
    a) a plurality of endless chains, each trained over and movable in a continuous path about an equal plurality of paired and substantially spaced-apart sprockets, to define upper and lower, substantially horizontal chain reaches, each pair of said paired sprockets being supported and coaxially aligned with respective said paired sprockets by first and second, elongated shafts extending through the centers thereof, said shafts being perpendicular to said chain reaches;
    b) a plurality of sails fixedly attached to each of said chains, said sails each including adjacent, first and second, superposable flaps having surfaces of substantially equal areas, said flaps being movable between a first, open position wherein said surfaces are in laterally adjacent, substantially co-planar relation and a second, closed position wherein said first and second flaps are folded about an axis perpendicular to said chain with said surfaces in facing, substantially superposed relation in a plane perpendicular to the plane of said sail when in said first, open position;

c) laterally successive, alternating guide means placed adjacent each of said chains such that a first guide means is operable to effect the movement of said flaps on said chain associated with said first guide means from said first, open position along its said upper chain reach to said second, closed position when said flaps travel along their said lower chain reach while a second said guide means immediately adjacent said first guide means is operable to effect the movement of said flaps on said chain associated with said second guide means from said first, open position along its said lower chain reach to said second, closed position when said flaps travel along their said upper chain reach, said alternating guide means effecting opposite directional movement of each laterally successive said chain and therefore effects opposite rotational direction of said paired sprockets associated with each laterally successive said chain;

d) at least one rotary electric generator;

e) means connecting a predetermined number of said paired sprockets to said generator to rotate the latter in response to movement of said chains by wind acting upon said sail flaps when in said first, open position thereof.

10. The invention according to claim 9 wherein said generator rotating means comprises;

a) a twin sprocket adjacently attached to each of said sprockets supported by said first shaft such that movement of said first shaft sprockets effects movement of said twin sprockets in the same rotational direction as their associated, first shaft sprockets;

b) a drive chain trained over each of said twin sprockets and including means for said drive chain to engage with respective, substantially spaced-apart, drive sprockets such that said drive sprockets all rotate in the same direction; and c) a third shaft co-axially aligning and extending through the centers of said drive sprockets such that rotation of said drive sprockets effects rotational movement of said third shaft and wherein said third shaft is attached to a said rotary electric generator to effect rotational movement thereof.

11. The invention according to claim 10 wherein said drive chain engagement means includes a pair of spaced-apart idler wheels placed about every other said drive sprocket, said drive chain being trained over said idler wheels with their associated drive sprocket engaged with the portion of said drive chain between said idler wheels such that its said drive sprocket rotates in the opposite rotational direction of its associated said twin sprocket upon movement of said chain when wind blows normal to its associated said flaps when in said first, open position thereof, said drive chain being directly trained over the other of said drive spockets such that all of said drive sprockets rotate in the same direction.

* * * * *